Dec. 31, 1968   K. W. TIBBALS   3,419,284
TANDEM HITCH

Filed Feb. 23, 1967   Sheet _1_ of 2

INVENTOR.
KERRY W. TIBBALS

BY Schroeder, Siegfried
& Ryan
ATTORNEYS

Dec. 31, 1968 K. W. TIBBALS 3,419,284
TANDEM HITCH
Filed Feb. 23, 1967 Sheet 2 of 2
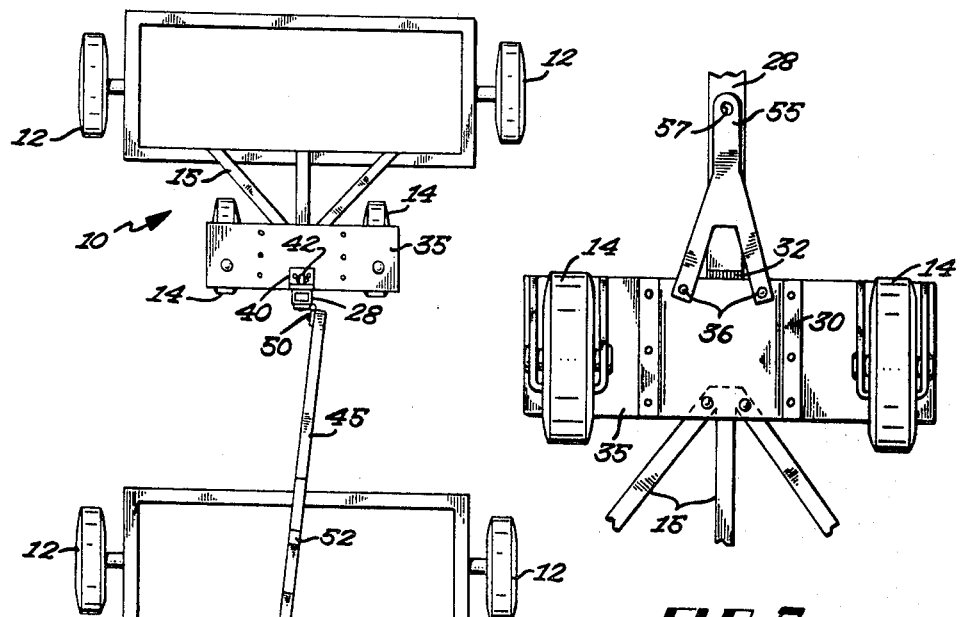
FIG 3
FIG 5
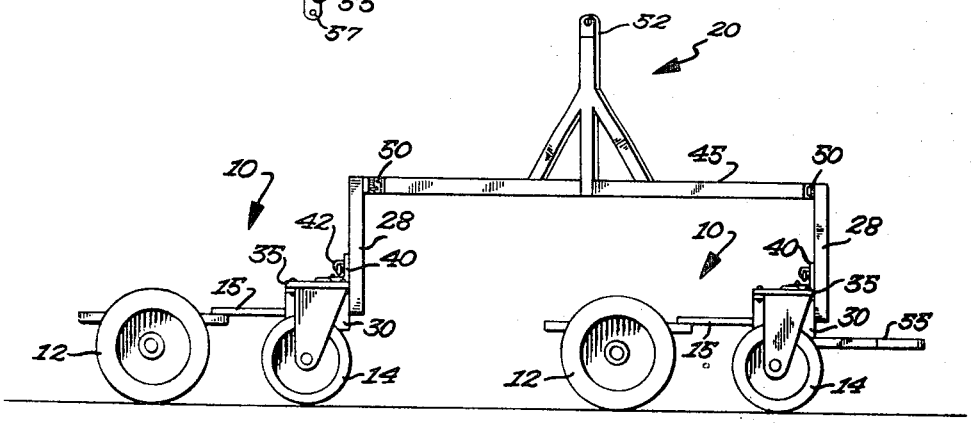
FIG 4
INVENTOR.
KERRY W. TIBBALS
BY Schroeder, Siegfried
& Ryan
ATTORNEYS

United States Patent Office 3,419,284
Patented Dec. 31, 1968

3,419,284
TANDEM HITCH
Kerry W. Tibbals, 335 17th Ave. N., Apt. 5,
Hopkins, Minn. 55343
Filed Feb. 23, 1967, Ser. No. 617,988
4 Claims. (Cl. 280—412)

ABSTRACT OF THE DISCLOSURE

This invention relates to an improved tandem hitch for agricultural implements having their own wheel supports for full stability. The improved hitch is comprised of an elongated structure having depending portions at the extremities of the same. Pivot structures at the ends of the depending portions connect the hitch to the implement and permit pivotal movement of the hitch relative to implements when the implements are placed in a tandem or trailing position. A latch on the implement and on the hitch holds it in a raised position. The depending portions of the hitch are also pivotally connected to the remaining portions of the hitch which carries a draw bar, the pivot axes of the last named pivotal connection being normal to those at the extremities of the hitch and connected to the implements. This simplified structure permits movement of implements in a side-by-side relationship for working purposes and in a tandem relationship for transporting purposes.

---

My invention relates to tandem hitches adapted to be connected to agricultural type implements to draw the same and more particularly to an improved tandem hitch primarily for use with agricultural implements of the type having their own wheel supports such as grain drills to facilitate drawing of such drills in a side-by-side working relationship and in a tandem relationship for transportation purposes.

In my prior application on a tandem hitch, Ser. No. 454,880, filed May 11, 1965 and now Patent 3,334,916, I disclosed a hitch which is primarily adaptable to draw or tow all types of agricultural implements. The improved hitch of the present invention is directed to a simplified structure particularly adaptable to agricultural implements having their own wheeled support for complete stability. With the improved tandem hitch design of the present invention, special wheel dollies are eliminated and an improved towing structure is provided which substantially simplifies the design of the tandem hitch, reduces the cost of the same and is easy to use. As such the present invention represents an improvement over my prior construction for use with a particular type agricultural implement.

Therefore, it is an object of this invention to provide an improved tandem hitch.

Another object of this invention is to provide in an improved tandem hitch a design which requires no rolling supports.

A further object of this invention is to provide an apparatus of this type which is simple to design, low in cost and easy to use.

These and other objects of this invention will become apparent from reading of the attached description together with the drawings wherein:

FIGURE 3 is a plan view of the improved tandem hitch in a transporting position for showing implements attached thereto in a transporting position;

FIGURE 4 is a side elevation view of the structure of FIGURE 3; and

FIGURE 5 is a bottom view of a portion of the improved tandem hitch.

Figure 1:
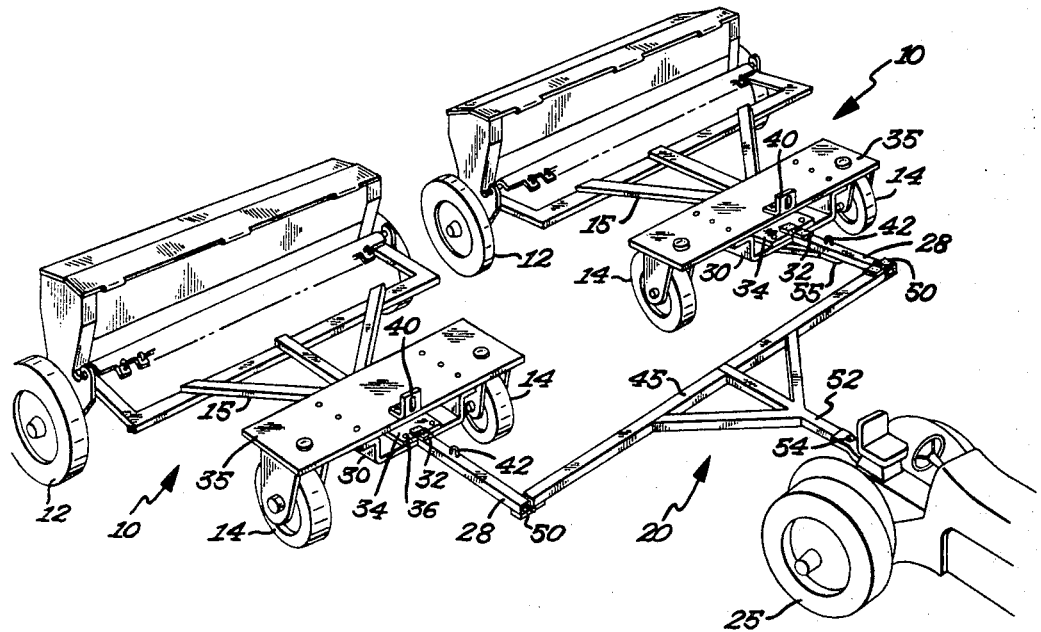
FIGURE 1 is a perspective view of the improved tandem hitch showing implements attached thereto in a working side-by-side position.

My invention in the improved tandem hitch for agricultural implements is shown in the drawings in connection with grain drills. It is applicable, however, to any type of agricultural implement having full wheel supports. Thus, as is shown in the drawings, the grain drills which are indicated generally as 10 have rear supporting wheel structures 12 and forward supporting wheel dollies 14 with a suitable interconnecting structure 15. The details of the seed drill form no part of the present invention and are shown only schematically in the drawings. Similar agricultural implements having equivalent wheel supports may be drawn by the improved tandem hitch. The tandem hitch is shown generally at 20 in the drawings as incorporating provisions for drawing two implements. It will be recognized, however, that a plurality of implements may be so connected within the teaching of the invention. Thus, the perspective view in FIGURE 1 shows the tandem hitch connected to a suitable draft means, such as a tractor 25, and drawing a pair of implements or drills 10 in a side by side relationship. The hitch includes a pair of depending arms or portions 28 each having a connecting plate at the extremity of the same. The plates are coupled to the arms or depending portions through hinge type pivot flanges or pivot members 32 which are connected respectively to the plates and arms through a suitable support member or hold means 34. In addition, the plates are suitably coupled to the supporting structures 35 of the front end of the drills through suitable bolt means 36. The hinge type pivot structures 32 provide a pivot axis which is normal to the extent of the arms and at the ends of the same to permit the arms to be pivoted from a substantially horizontal position with respect to the implements or drills to a position substantially vertical thereto. A suitable latch structure 40 mounted on the support structure 35 of each of the implements cooperates with latching members 42 mounted on the arms 28 to hold and lock the arms in an elevated position. The depending arms or connecting portions of the hitch are coupled together through the draw bar member or elongated member 45 which extends between the implements and is coupled to the arms at the extremities of the draw bar member and the arms respectively through hinge or pivot structures 50. These hinges or pivot members or structures 50 each provide a pivot axis which is parallel to the extent of the arms and normal to the extent of the draw bar member. These pivot axes are in spaced parallel relationship and define a second set of pivot axes for the tandem hitch which are normal to the first named pivot axis of the pivot structures 32. A similar pivot structure may be obtained by forming the depending arms as telescopic parts which will rotate relatively in such a pivot axes relationship but will not disengage longitudinally. Intermediate the draw bar member 45 is a draft tongue or connector member 52 having a suitable coupling 54 at the extremity of the same by means of which the tandem hitch is adapted to be connected to the coupling of a draft means in a conventional manner.

Figure 2:
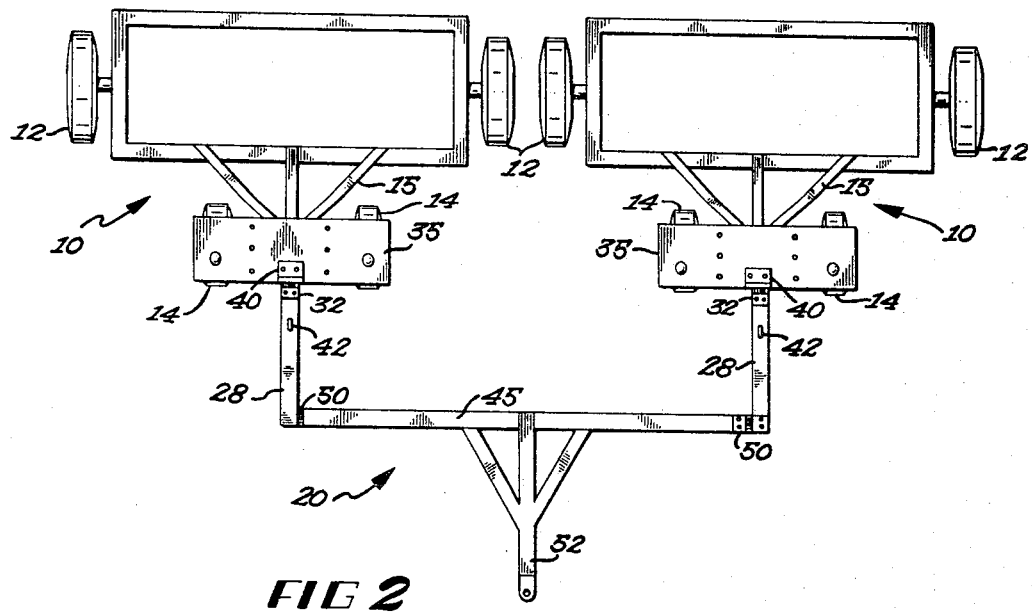
FIGURE 2 is a plan view of the structure of FIGURE 1.

In FIGURE 1 the tandem hitch is shown coupled to a pair of implements for the working position to draw the implements in a side-by-side position by relationship. FIGURE 2 shows the structure schematically in a plan view. With the draft tongue 52 attached to the tractor, the hitch pivots on the tractor with respect to the turning axis of the tractor and the implements are drawn thereby.

The pivotally mounted wheels of the implement permit turning movement to follow the tractor. Further, the hitch will not be elevated when so connected.

FIGURES 3 and 4 show the tandem hitch in a transport position in plan and side elevation views respectively. When it is desired to place the implements in a trailing or tandem position, the coupler 54 is disconnected from the draft tongue and the hitch is elevated by lifting or pivoting the arms 28 with the connecting draw bar member 45 with respect to a vertical position with respect to the implements attached thereto about the pivot axes of the pivot members 32, which axes are aligned when the implements are in a side-by-side position permitting elevation of the hitch. The latches formed by the bracket 40 and the loop 42 on the arms permit the securing of the arms 28 in the elevated position. The extent of the arms 28 are of such dimension as to clear the height of the implements being drawn thereby as the hitch moves the implements to a trailing position and during transport position. One of the plate structures 30 on one of the implements includes in addition a draft tongue or coupler member 55 with a suitable connector or aperture 57 therein through which the draft means or tractor may be connected. With the draw bar member in an elevated position, the draft means is so connected to this implement at the additional or second coupler member 55 and forward movement of the implement will cause the opposite implement connected to the tandem hitch to trail to a tandem position. The hinge structures 50 connected to the tow bar permit such rotative movement in that the hinges will pivot in this direction. Thus, it will be noted in FIGURES 1 through 4, that the hinge structures 50 on the draw bar member 45 are so connected to the respective arms as to be located on opposite ends thereof allowing the movement to the trailing position. As the implement to which the draft means or tractor is attached is moved forward, the second implement will trail to the position shown in FIGURES 3 and 4 with the draw bar member providing the connecting structure between the arms or projecting portions to provide the draft coupling between the implements. The arms 28 of the hitch are latched with respect to the respective implements by means of the brackets 40 and loops 42 thereon and suitable keys (not shown) to insure that the arms remain in an elevated position. Thus the implements can be towed or pulled in the transport condition through narrow gates, down roadways or the like whenever it is desired to move agricultural implements over terrain where the implements cannot be properly drawn in the side-by-side position. The bottom view of the portion of the implement as shown in FIGURE 5 discloses the relationship of the additional coupler member 55 with respect to the hinge structure 30 on this particular implement.

Movement of the hitch from a tandem to a side-by-side position is accomplished by reversing this procedure. The draft means will back the implement up in an arcuate direction to start the turning movement between the implements allowing the implements to go to the side-by-side position at which point the draft means is released from the additional coupler member 55, and the arms 28 are released from the respective latched position on the implements so that the structure may again be recoupled to the tractor through the draft tongue 52.

This improved structure permits agricultural implements of the type described to be towed in a tandem or side-by-side working relationship with a minimum of effort and time required to change the hitch from the side-by-side to the tandem or pulling relationship. Further, the simplified tandem hitch eliminated the requirement of separate dollies thereby greatly reducing the cost of the hitch and making it readily available for implements of this type.

In considering this invention, it should be remembered that the present disclosure is intended to be illustrative only in the scope of the invention and should be determined by the appended claims.

What is claimed is:

1. A tandem hitch comprising, a hitch frame including a plurality of projecting portions each having connecting support members at the free extremities of the same, each of said support members being adapted to be connected to an implement to be drawn thereby, a transversely extending draw bar member included in the hitch frame and connected to the plurality of projecting portions, a draft tongue connected to the draw bar member intermediate its extent and adapted to be connected to a power draft means to tow the hitch, a first plurality of pivot structures each included respectively in the plurality of projecting portions of the hitch frame with pivot axes which align when implements are connected to the respective support members and with the implements in a side-by-side relationship to permit the projecting portions and the draw bar member to be pivoted relative to the implements about the aligned axes from a position of alignment with the implements to a raised position, a second plurality of pivot structures each included respectively in the plurality of projecting portions of the hitch frame with pivot axes positioned in a spaced parallel relationship when implements are connected to the respective support members to permit pivotal movement of the implements connected thereto relative to the hitch frame about the spaced pivotal axes when the hitch frame is in a raised position relative to such implements, and further means included in one of said support members adapted to attach said one of said support members to a power draft means such that the implements connected to the support members will be positioned in and drawn in a tandem relationship with the hitch frame and the draft tongue mounted thereon pivoted to a raised position relative to the implements drawn by the hitch.

2. The tandem hitch of claim 1 in which the depending portions are two in number to define with the draw bar member a generally U-shaped structure, and in which the support members when attached to implements permit pivoting of the hitch frame about the aligned axes from an aligned to a raised position relative to implements connected thereto for towing purposes.

3. The tandem hitch of claim 2 and including latch means included in part in the projecting portions for locking the projecting portions in a raised position.

4. A tandem hitch comprising, a hitch frame including a plurality of projecting portions each having connecting support members at the free extremities of the same, each of said support members being adapted to be connected to an implement to be drawn thereby, a transversely extending draw bar member included in the hitch frame and connected to the plurality of projecting portions, a draft tongue connected to the draw bar member intermediate its extent and adapted to be connected to a power draft means to tow the hitch, a first plurality of pivot structures each included respectively in the plurality of projecting portions of the hitch frame with pivot axes which align when implements are connected to the respective support members and with the implements in a side-by-side relationship to permit the projecting portions and the draw bar member to be pivoted relative to the implements about the aligned axes from a position of alignment with the implements to a raised position, a second plurality of pivot structures each included respectively in the plurality of projecting portions of the hitch frame with pivot axes positioned in a spaced parallel relationship when implements are connected to the respective support members to permit pivotal movement of the implements connected thereto relative to the hitch frame about the spaced pivotal axes when the hitch frame is in a raised position relative to such implements, and further means included in one of said support members adapted to attach said one of said support members to a power draft means such that the implements connected to the support members will be positioned in and drawn in a tandem relationship with the hitch frame and the draft tongue mounted thereon pivoted to a raised position relative to the implements drawn by the hitch, said pivot structures of the support members for the hitch being of a hinged-type connection and the projecting portions being a pair of arms with the hinged-type connections being positioned at the ends of the arms and pivoted about an axis normal to the extent of the arms and with the draw bar member extending normal to the extent of the arms and being pivoted on the arms about an axis parallel to the extent of the arms, and including latch means mounted on the support member for locking the projecting portions in a raised position.

References Cited

UNITED STATES PATENTS

| 2,976,058 | 3/1961 | Sandgren | 280—413 |
| 3,064,996 | 11/1962 | Roppel | 280—412 |
| 3,334,916 | 8/1967 | Tibbals | 280—412 |

FOREIGN PATENTS

| 148,178 | 12/1954 | Sweden. |
| 186,156 | 11/1963 | Sweden. |

LEO FRIAGLIA, *Primary Examiner.*